United States Patent
Phillips (10) Patent No.: US 10,273,582 B1
(45) Date of Patent: Apr. 30, 2019

(54) CHEMICAL METHOD TO CREATE METAL FILMS ON METAL AND CERAMIC SUBSTRATES

(71) Applicant: The United States of America, as represented by the Secretary of the Navy, Washington, DC (US)

(72) Inventor: Jonathan Phillips, Pacific Grove, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 46 days.

(21) Appl. No.: 15/251,035

(22) Filed: Aug. 30, 2016

Related U.S. Application Data (60) Provisional application No. 62/370,066, filed on Aug. 2, 2016.

(51) Int. Cl.
*C23C 18/00* (2006.01)
*C23C 18/08* (2006.01)
(Continued)

(52) U.S. Cl.
CPC ............... *C23C 18/08* (2013.01); *B22F 1/00* (2013.01); *B22F 9/00* (2013.01); *B82Y 40/00* (2013.01);
(Continued)

(58) Field of Classification Search
CPC .......... B22F 1/00; B22F 9/00; B22F 2998/00; B22F 2999/00; B82Y 40/00; H01M 4/00
See application file for complete search history.

(56) References Cited

U.S. PATENT DOCUMENTS

| | | | |
|---|---|---|---|
| 8,709,126 B1 * | 4/2014 | Luhrs | B22F 1/0096 75/351 |
| 8,894,886 B1 * | 11/2014 | Luhrs | C01B 32/192 252/378 R |
| 9,308,585 B2 | 4/2016 | Leseman | |

OTHER PUBLICATIONS

NPL, "Kinetics of Reduction of NiO—WO3 Mixtures by Hydrogen", Hesham M. Ahmed, Abdel-Hady A. El-Geassy, and Seshadri Seetharaman, Metallurgical and Materials Transactions B vol. 41B, Feb. 2010, pp. 161-172.*

(Continued)

*Primary Examiner* — David P Turocy
*Assistant Examiner* — Mohammad Mayy
(74) *Attorney, Agent, or Firm* — Naval Postgraduate School; Scott Bell (57) ABSTRACT

The disclosure provides a method for generating a metallic coating on a substrate using a mixture comprising a precursor compound typically of chromium oxide, a chemical agent typically comprising $NH_z$, and an inert transport fluid. The precursor compound and chemical agent are generally in the form of particulates having mean diameters less than about 100 microns, and the transport fluid is present in an amount sufficient to facilitate application of the mixture to a substrate. The mixture is applied to a substrate and the coated substrate is heated to a temperature exceeding the decomposition temperature of the chemical agent, generating a reducing gas typically comprising CO, $H_x$, and/or $NH_x$. In a particular embodiment, the precursor compound is $CrO_2$, $Cr_3O_4$, CrO, or mixtures thereof, the chemical agent is urea, and the coated substrate is placed in a reactor having an inert atmosphere and subjected to a temperature of about 700° C. for about 5 minutes while maintaining an inert gas flow through the reactor.

17 Claims, 11 Drawing Sheets

(51) Int. Cl.
*C23C 18/02* (2006.01)
*B82Y 40/00* (2011.01)
*B22F 9/00* (2006.01)
*H01M 4/00* (2006.01)
*B22F 1/00* (2006.01)

(52) U.S. Cl.
CPC .............. *C23C 18/02* (2013.01); *H01M 4/00* (2013.01); *B22F 2999/00* (2013.01)

(56) References Cited

OTHER PUBLICATIONS

NPL, "Novel Process for Solid State Reduction of Metal Oxides and Hydroxides", Claudia Luhrs, Margaret Kane, Zayd Leseman, Jonathan Phillips, Metallurgical and Materials Transactions B, Feb. 2013, vol. 44, Issue 1, pp. 115-122.*

"Novel Non electrolytic Process for Chromium and Nickel Coating", Jonathan Phillips and Claudia C. Luhrs, 105 page, Jun. 2015.*

Luhrs et al., "Novel Process for Solid State Reduction of Metal Oxides and Hydroxides,"Metall and Materi Trans B (2013) 44: 115.

Zea et al., "Modified reductive expansion synthesis (M-RES) for the production of carbon porous material from deteriorated banknotes," International Journal of ChemTech Research 8(3) (2015).

Zea et al., "Reductive/expansion synthesis of zero valent submicron and nanometal particles," J. Mater. Res. 26(5) (2011).

Lowell et al., Reduction expansion synthesis for magnetic alloy powders, (masters thesis, Naval Postgraduate School, 2015).

Soliman et al.,"Aerosol Synthesis of Nano and Micro-scale Zero Valent Nickel Particles from Oxide Precursors," Proceedings of the ASME 2010 International Mechanical Engineering Congress & Exposition, IMECE2010, Nov. 12-18, 2010, Vancouver, British Columbia, Canada.

Soliman et al., "Aerosol Synthesis of Nano and Micro-scale Zero Walent Metal Particles from Oxide Precursors," LA-UR-10-04206, available at http://permalink.lanl.gov/object/tr?what=info:lanl-repo/lareport/LA-UR-10-04206, last accessed Aug. 10, 2016.

* cited by examiner

CHEMICAL METHOD TO CREATE METAL FILMS ON METAL AND CERAMIC SUBSTRATES

RELATION TO OTHER APPLICATIONS

This patent application claims priority from provisional patent application 62/370,066 filed Aug. 2, 2016, which is hereby incorporated by reference in its entirety.

FIELD OF THE INVENTION

One or more embodiments relates to a method for generating a metallic coating on a substrate using a mixture comprising a precursor compound and a chemical agent applied to the substrate and subjected to heating.

BACKGROUND

Metal coatings are commonly used either as a surface protectant or to enhance appearance on both metallic and non-metallic objects. A widely used metal finish is chromium plating to generate hard, corrosion-resistant, durable surfaces in various non-engineering and engineering applications. However, the typically utilized electrolytic chrome plating methodology has serious drawbacks.

Electrolytic chrome plating utilizes a chromium bath involving a mixture of chromium trioxide ($CrO_3$) and sulfuric acid (sulfate, $SO_4$) and produces hexavalent chrome, a highly carcinogenic material. This has led to the restriction/regulation on its use, concomitantly reducing the use of chrome coatings, to a minimum. The process is deemed both hazardous, and expensive. Indeed, chrome coating is primarily, but not exclusively, employed at present only in critical corrosion resistant applications such as coating of particular aircraft parts (e.g. landing gear), and some parts of hydraulic systems. Another limitation of the present process is that it only can be employed to coat metal objects. This has led to a search for alternative chrome coating processes that do not involve the creation of hexavalent chrome, and can be employed to coat both metal and non-metal objects. The invention of a new process that is safe, simple and inexpensive will allow chrome coatings to be widely employed for corrosion resistance, aesthetics, etc.

These and other objects, aspects, and advantages of the present disclosure will become better understood with reference to the accompanying description and claims.

SUMMARY

The disclosure provides a method for generating a metallic coating on a substrate, metal or non-metal, using a chemical process. The method generally comprises generating a mixture of a precursor compound and a chemical agent, where the precursor compound typically comprises a metal oxide, metal hydroxide, metal nitrate, metal carbonyl, metal sulfide, or other stable molecular form containing a metal, and the chemical agent is a compound that generates reducing gases upon thermal decomposition. Typically the chemical agent comprises stable chemical compounds containing $NH_z$, CO and other groups, and the reducing gases created from the decomposition of these compounds include CO, $H_x$, and/or $NH_x$ and other molecules and radicals that can subsequently act as reducing agents, when x> or =1. In an embodiment, the precursor compound and chemical agent are in the form of particulates having mean diameters less than about 100 microns, and a transport fluid is added for the purpose of facilitating application of the mixture to a substrate.

The mixture is applied to the substrate and the mixture coated substrate is heated to a decomposition temperature of typically about 700° C. The temperature decomposes the chemical agent results in the generation of reducing gas comprising species such as CO, $H_x$, $NH_x$, or mixtures thereof. The mixture coated substrate is maintained at the decomposition temperature for a period of time, typically minutes, sufficient to allow the reducing gas to contact the precursor material and deposit a metallic coating on the surface of substrate. In an embodiment, contact between the reducing gas and the precursor material generates a zero valence metal comprising the metal of the precursor material, and the metallic coating comprises the zero valence metal. Typically the mixture coated substrate is heated in a reactor having an inert atmosphere, and some portion of the reducing gas and reaction produces are exhausted from the reactor.

In a particular embodiment, the precursor compound is $CrO_2$, $Cr_3O_4$, CrO, or mixtures thereof, the chemical agent is urea ($CO(NH_2)_2$), and the mixture further comprises an inert transport fluid present in a quantity sufficient to facilitate application to a substrate. The mixture is applied to the substrate by dipping or brushing and the coated substrate is placed in a reactor having an inert atmosphere and therein subjected to a temperature of about 700° C. for about 5 minutes, while maintaining an inert gas flow through the reactor such that gas velocity over the part is about <1 cm/sec.

The novel apparatus and principles of operation are further discussed in the following description.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for generating a metallic coating on a substrate using a mixture comprising a precursor compound and a chemical agent applied to the substrate.

The disclosure provides a method for generating a metallic coating on a substrate using a chemical process. The method generally comprises generating a mixture of a precursor compound and a chemical agent, where the precursor compound typically comprises a metal oxide or metal hydroxide and the chemical agent is a compound that generates reducing gases upon thermal decomposition. Typically the chemical agent comprises $NH_z$ and the reducing gases comprise CO, $H_x$, and/or $NH_x$. In an embodiment, the precursor compound and chemical agent are in the form of particulates having mean diameters less than about 100 microns, and a transport fluid is added for the purpose of facilitating application of the mixture to a substrate. In a particular embodiment, the precursor compound is $CrO_2$, $Cr_3O_4$, CrO, or mixtures thereof, the chemical agent is urea, and the coated substrate is placed in a reactor having an inert atmosphere and subjected to a temperature of about 700° C. for about 5 minutes while maintaining an inert gas flow through the reactor. In a particular embodiment, the method generates a substrate having a metallic coating comprised of zero valence chromium in a chemical reaction resulting from thermal decomposition of the chemical agent in a manner avoiding the production of hexavalent chromium.

Figure 1:
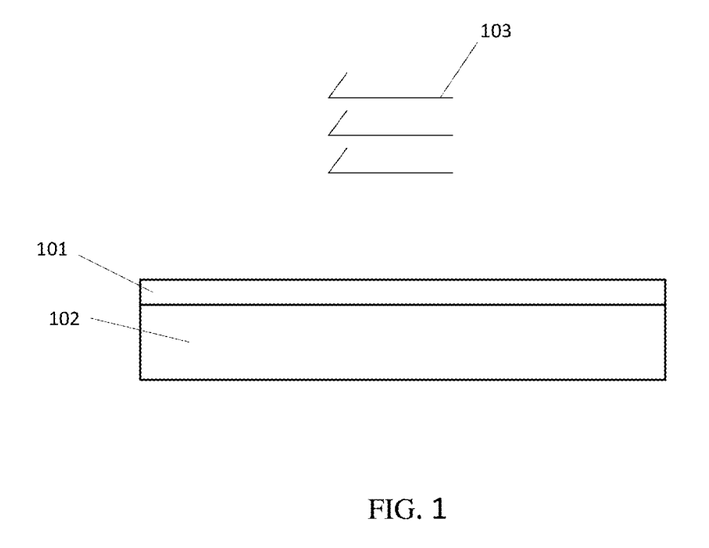
FIG. 1 illustrates an embodiment of a mixture coated substrate.

FIG. 1 illustrates a specific embodiment generated by the method disclosed. At FIG. 1, a mixture 101 is generated and comprises a precursor compound and a chemical agent. The precursor compound comprises a metal, where the metal typically comprises a metal oxide or metal hydroxide. In a particular embodiment, the precursor compound is $CrO_2$, $Cr_3O_4$, CrO, or mixtures thereof. The chemical agent is a compound that generates reducing gases upon thermal decomposition, where the reducing gases typically comprise CO, $H_x$, $NH_x$, or mixtures thereof, where x≥1. In a typical embodiment, the chemical agent comprises $NH_z$ where z≥1. Typically the precursor compound and chemical agent are in the form of particulates having mean diameters less than about 100 microns, and the mixture comprises a generally homogeneous mixture of the particulates. In some embodiments, a transport fluid typically comprising water or some other liquid such as ethanol is added for the purpose of facilitating application of the mixture to substrate 102. At FIG. 1, mixture 101 and substrate 102 comprise a mixture coated substrate.

The mixture comprising the mixture coated substrate is then heated to a decomposition temperature having a temperature sufficient to decompose the chemical agent and produce the reducing gas of CO, $H_x$, $NH_x$, or mixtures thereof. Typically, the entirety of the mixture coated substrate is heated to the decomposition temperature. Generally, the decomposition temperature is from about 400° C. to about 1200° C., and in an embodiment, greater than 700° C. At least the mixture comprising the mixture coated substrate is maintained at the decomposition temperature for a period of time sufficient to allow the reducing gas to contact the precursor material and deposit a metallic coating on the surface of substrate 102, where the metallic coating comprises the metal comprising the precursor material within mixture 101. In an embodiment, contact between the reducing gas and the precursor material generates a zero valence metal comprising the metal of the precursor material, and the metallic coating comprises the zero valence metal. In some embodiments, the mixture coated substrate is heated through exposure to a heated inert atmosphere 103 in a reactor. In an embodiment, an inert gas comprises at least 90 volume percent of the heated inert atmosphere and the inert gas comprises nitrogen, argon, helium, other noble gases, or mixtures thereof. In a further embodiment, contact between the reducing gas and the precursor material generates a reaction gas and some portion of the reaction gas is exhausted from the reactor.

Figure 2:
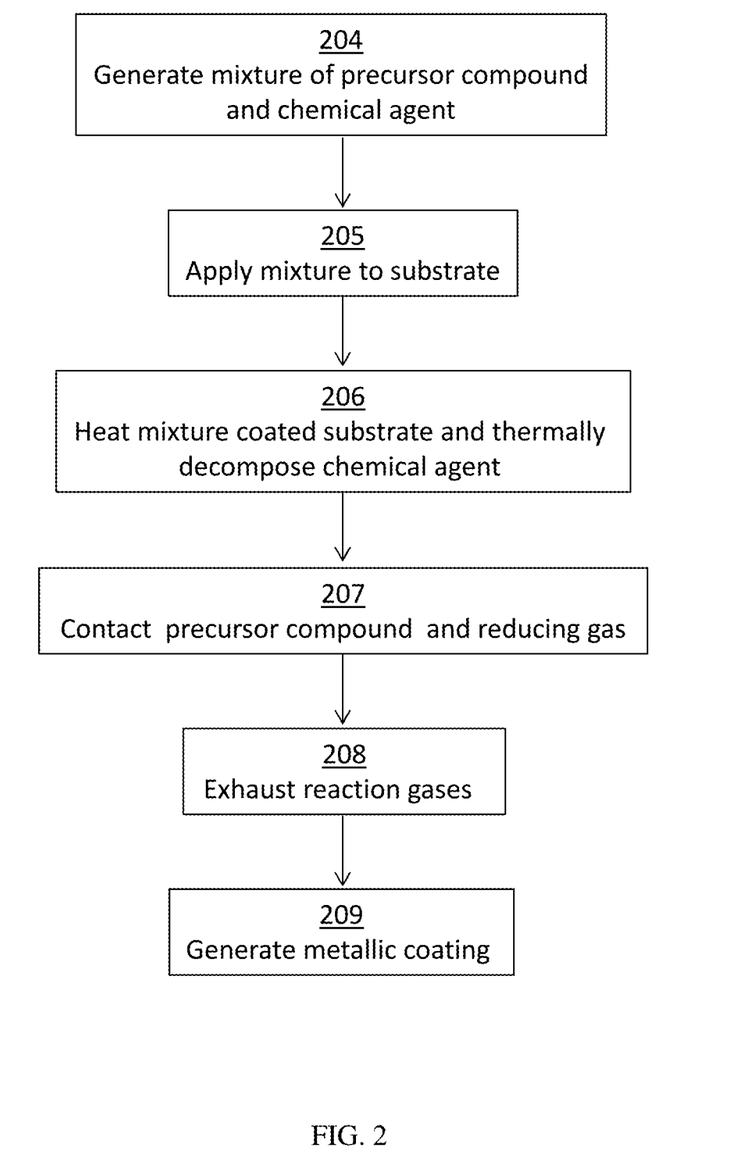
FIG. 2 illustrates an embodiment of the disclosed methodology.

Typical steps comprising the disclosed methodology are illustrated at FIG. 2. At step 204, the mixture comprising the precursor material and chemical agent is generated. At 205, the mixture is applied to the substrate and a mixture coated substrate produced. At 206, the mixture coated substrate is heated to the decomposition temperature to generate the reducing gas, and at 207 contact results between the reducing gas and the precursor material. The contact generates a reaction gas which is exhausted at 208. At 209, the mixture coated substrate is maintained at the decomposition temperature to generate the metallic coating.

In an embodiment, the mixture comprises a weight ratio of the chemical agent to the precursor compound of at least 2. In an embodiment, the metal precursor comprises a metal oxide, and the mixture comprises a weight ratio of the chemical agent to the precursor compound of at least 3. In another embodiment, the mixture comprises a molar ratio of nitrogen-hydrogen (N—H) containing molecules to positive valent metal atoms of at least 3:1.

The metal comprising the precursor compound may be any metal. In particular embodiment, the precursor compound comprises chromium in a non-zero valence state. Likewise, the metal may comprise any metallic compound. In specific embodiment, the metallic compound is a metallic oxide, metallic hydroxide, or metallic nitride. The chemical agent may be any substance which undergoes thermal decomposition at a decomposition temperature and generates a reducing gas comprising CO, $H_x$, $NH_x$, or mixtures thereof, where x is greater than or equal to 1. In a typical embodiment, the chemical agent comprises $NH_z$, where z≥1. The decomposition temperature is typically less than a melting temperature of the precursor compound and the metal comprising the precursor compound. The chemical agents can include, but are not limited to, nitrogen-hydrogen (N—H) containing molecules such as urea [$(NH_2)_2CO$], ammonia ($NH_3$), a compound containing —$NH_2$ or —NH, etc. For example, urea can be decomposed to generate species including CO, $H_x$, and $NH_x$ groups, which are active and ready for reduction reactions. The chemical agents can also include those present in nature to generate reducing species upon decomposition.

In a particular embodiment, the novel process disclosed is a pure chemical process for generating a chromium coating in which the precursor to the metallic chrome found in the final chrome coat layer may be in the valance state +5, +4 (e.g. CrO2), +3 (e.g. Cr3O4) or +2 (e.g. CrO) states, and in the form of solid particles. The final valence state of the chrome is zero. Hence hexavalent chrome is never part of the process. In addition, the chrome coating technology introduced herein can be modified, by simple analogy, to create metal coatings from any transition metal oxide, or to generate alloy coatings of two or more transition metals.

As discussed, generally the precursor compound comprises a plurality of first particles and the chemical agent comprises a second plurality of particles, and the mixture comprises a generally uniform mixture of the particles. Generally, sufficient uniformity may be based on inspection by eye. In a particular embodiment, the mixture is generated by initially generating a solid-solid heterogeneous mixture of a first plurality of precursor compound particles and a second plurality of chemical agent particles, where generally a mean diameter of both the precursor compound particles and the chemical agent particles is less than about 500 micron, more typically less than 100 micron. Within this disclosure, the term "mean diameter" when referring to a plurality of granules or pellets means an equivalent spherical diameter such as a Sauter mean diameter determined by means known in the art such as sieving, microscopy, sedimentation, permeametry, laser diffraction, or other means, or as reported by a manufacturer. See e.g., Martin Rhodes, *Introduction to Particle Technology* ($2^{nd}$ ed. 2008).

The precursor compound particles and chemical agent particles may be mixed into the solid-solid heterogeneous mixture by hand or using any means known in the art, such as static mixers, shaker-mixers, V-blenders, and others. Any means by which the precursor material may be dispersed among the chemical agent and vice-versa is sufficient. Combination and mixing of the precursor compound particles and the chemical agent particles is typically conducted until the precursor compound particles and chemical agent particles are substantially randomly dispersed among each other. Sufficient homogeneity of the solid-solid heterogeneous mixture can typically be gauged by those skilled in the art. In a particular embodiment, the solid-solid heterogeneous mixture has a Lacey mixing index greater than 0.5 based on the proportion of the precursor compound particles. See e.g., Tasirin et al., "Mixing Process of Binary Polymer Particles in Different Type of Mixers," Modern Applied Science 3(6) (2009) and incorporated references, among many others.

As discussed, mixture 101 may additionally comprise a transport fluid, such as water or ethanol, in order to generate a consistency of mixture 101 suitable for application. In a particular embodiment, mixture 101 is at least 10 weight percent (wt. %) of the transport fluid. The solid-solid heterogeneous mixture may be combined with the transport fluid by hand or in a mixer appropriate for solid-liquid mixing. Mixture 101 may be applied to substrate 102 by any suitable means such as brushing, dipping, spraying, or other means known in the art.

In some embodiments, the mixture coated substrate is heated to the decomposition temperature by exposure to a heated inert atmosphere 103 in a reactor. In other embodiments, reaction gases generated by contact between the reducing gas and precursor compound are exhausted from the reactor. Generally, at lower exhausting flow rates, the reducing gases generated by the decomposition of the chemical agent are resident in the area of the metal precursor components for a longer period, increasing the net reaction and permitting more metal to form. Higher flow rates may tend to flush the reducing gas out of the reactor before they have time to react with metal precursors. In a particular embodiment, a flow of inert gas is maintained over the mixture coated substrate such that a gas velocity over the mixture coated substrate is less than about 5 cm/sec, preferably less than 1 cm/sec. In certain embodiments, the "inert gas" is any gas which does not undergo chemical reactions with the material precursor, the chemical agent, the resulting zero valence metal, or the reducing gas at the decomposition temperature utilized within the method. For example, the inert gas may comprise $N_2$, He, Ar, Kr, or other generally inert gases known in the art.

EXAMPLE 1

Figure 3:
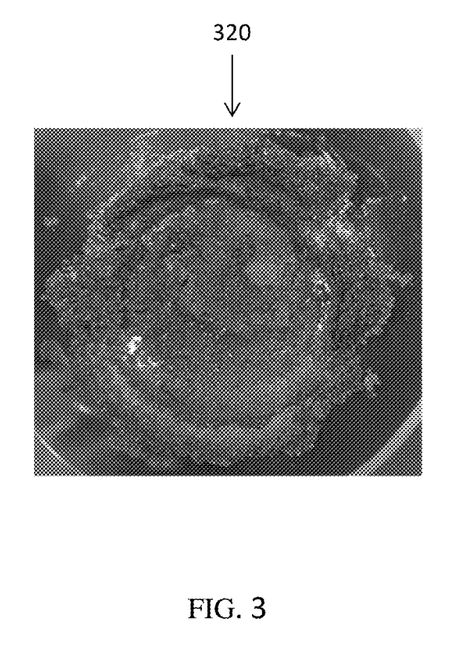
FIG. 3 illustrates a urea/chromic oxide mixture.
Figure 4:
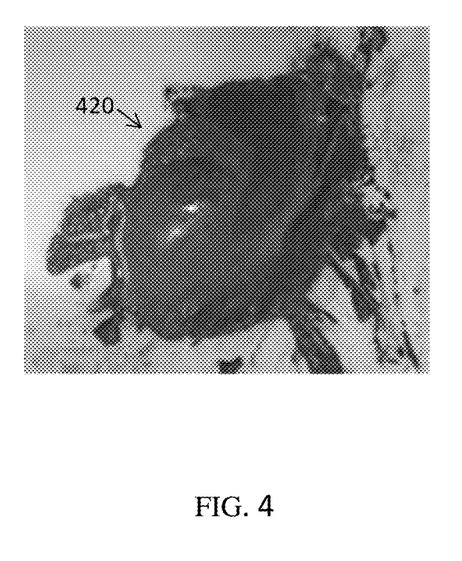
FIG. 4 illustrates a urea/chromic oxide/water paste.

In an exemplary embodiment, $Cr_3O_4$ in the form of particles and having a mean diameter of less than 100 micron was mixed with urea in a weight ratio of urea/$Cr_3O_4$ of greater than 3/1. The components were ground until the solid-solid mixture was homogeneous upon inspection by eye. Water was added and mixed until the mixture formed a paste. This is approximately 30% water by weight of the paste. A depiction of a urea/$Cr_3O_4$ mixture is depicted at FIG. 3 at 320, with FIG. 4 depicting the addition of deionized water and subsequent formation of a paste generally indicated at 420.

Figure 5:
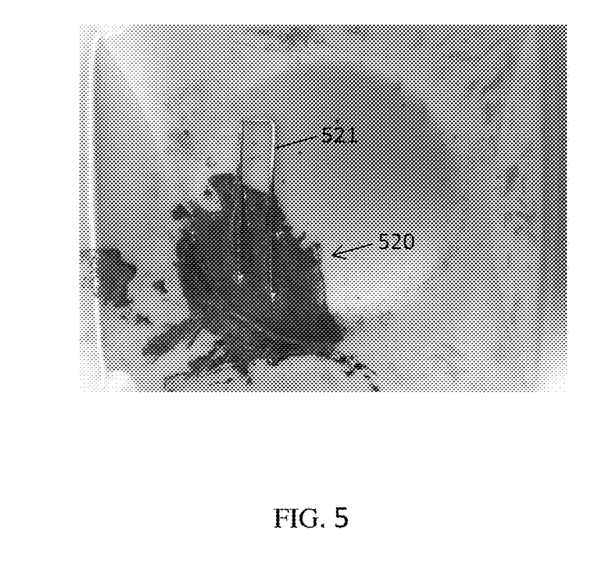
FIG. 5 illustrates an iron substrate coated with the urea/chromic oxide/water paste.
Figure 6:
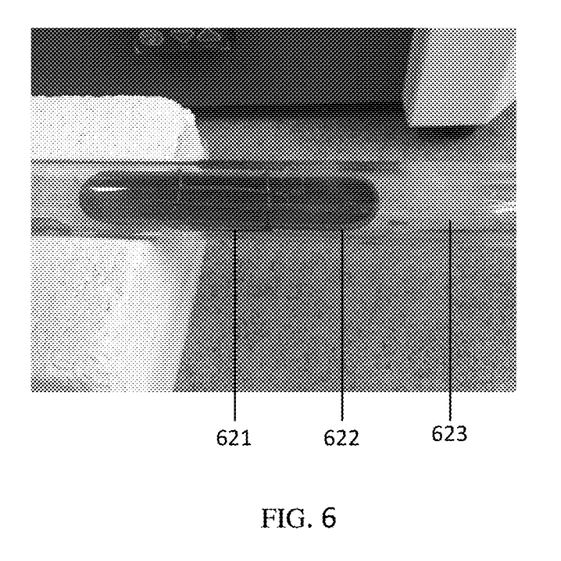
FIG. 6 illustrates a coated substrate in a high temperature vessel.

An iron wire (99.9% Fe) was dipped in the mixture, and the resulting coat dried using an ambient temperature fan until the coating no longer ran due to gravity. FIG. 5 illustrates an iron wire 521 being dipped in mixture 520. The coated part held within an alumina boat and placed in a high temperature stable vessel, and air removed by flowing $N_2$ through the vessel. FIG. 6 illustrates the iron wire 621 held on alumina boat 622, within high temperature stable vessel 623. After flushing was complete, inert gas flow was continue at a low flow such that gas velocity over the part was about <1 cm/sec.

Figure 7:
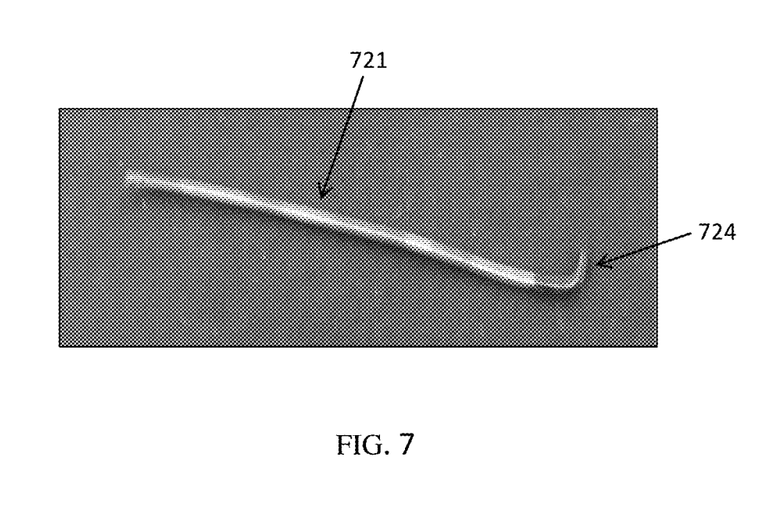
FIG. 7 illustrates a treated polished substrate.

The reactor was then placed in a furnace pre-heated to 700 C and maintained in the furnace for about 5 minutes, then removed. Following removal, inert gas flow through the reactor was increased by about a factor of 10. The reactor was cooled and the coated part removed. FIG. 7 illustrates the iron wire, where the section generally indicated by 721 depicts a section after polishing to remove material (probably carbon) from the coated area, and the section generally indicated by 724 depicts a section which was not coated during the process. Typically the chrome coat following heating is buried under a layer of loosely adhering material, primarily carbon. After polishing with a cloth, by hand, the chrome is clearly visible.

FIGS. 8-13 illustrate EDS analysis and SEM micrographs of the iron wire (99.9% Fe) at various locations. The wire was then cut perpendicular to the central axis of the wire with a saw, and the surface exposed by this process subsequently polished.

Figure 8:
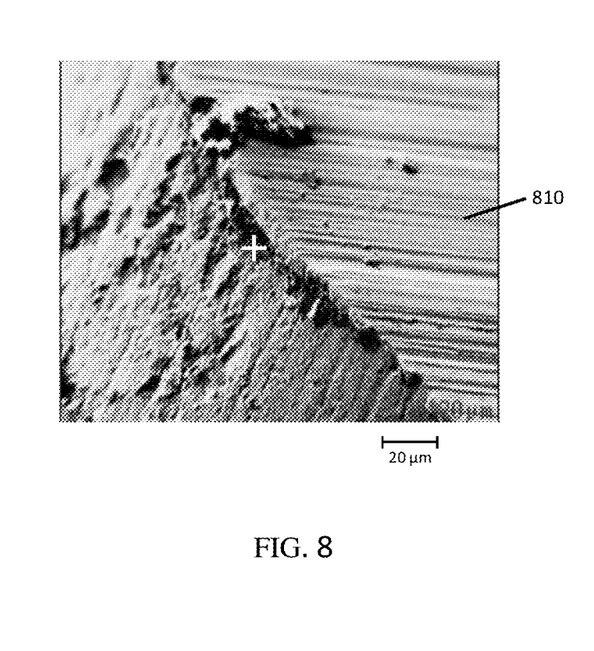
FIG. 8 illustrates a first location on a particular material generated by the disclosed method.
Figure 9:
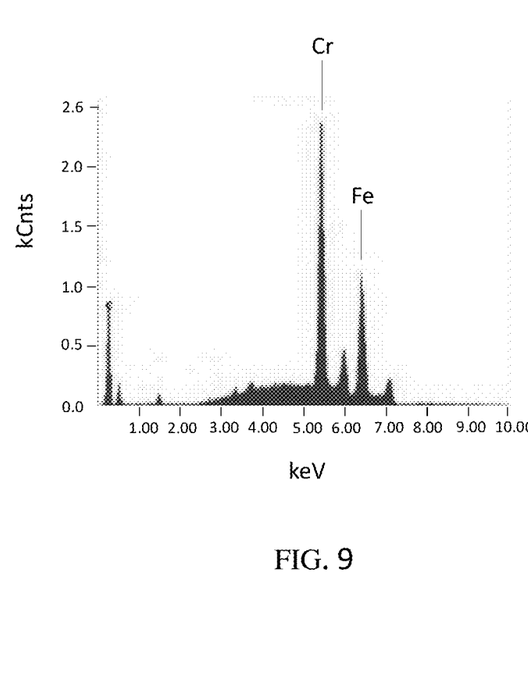
FIG. 9 illustrates an energy dispersive spectroscopic analysis (EDS) of the particular material at the first location.

FIG. 8 illustrates the iron wire substrate 810 and clearly shows a surface layer, and a chemical analysis of that layer demonstrates that the coating layer that forms on the wire following this treatment is predominantly Chrome metal. Specifically, FIG. 9 illustrates an energy dispersive spectroscopic analysis (EDS) performed with the scanning electron microscope at the spot marked with a white "+" in FIG. 8, and shows primarily a chrome signal Cr with some iron Fe. Secondary peaks suggest some carbon and oxygen. The standard interpretation of this spectrum is nearly pure chromium metal exists in the coating layer. The iron is a natural background signal arising from the wire, and the oxygen and carbon peaks were found to be background, for example from the carbon tape used to hold the sample to the sample holder, everywhere. In sum, there is every reason to believe pure chrome metal is found at the marked spot and any iron, carbon or oxygen signal is 'background'.

Figure 10:
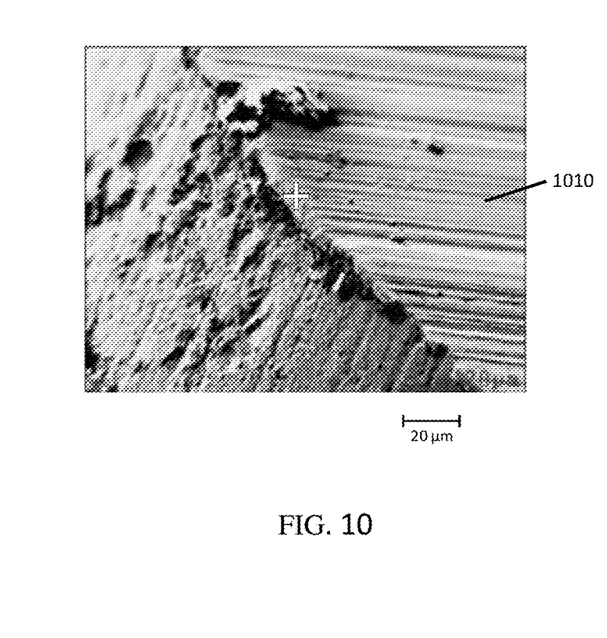
FIG. 10 illustrates a second location on the particular material.
Figure 11:
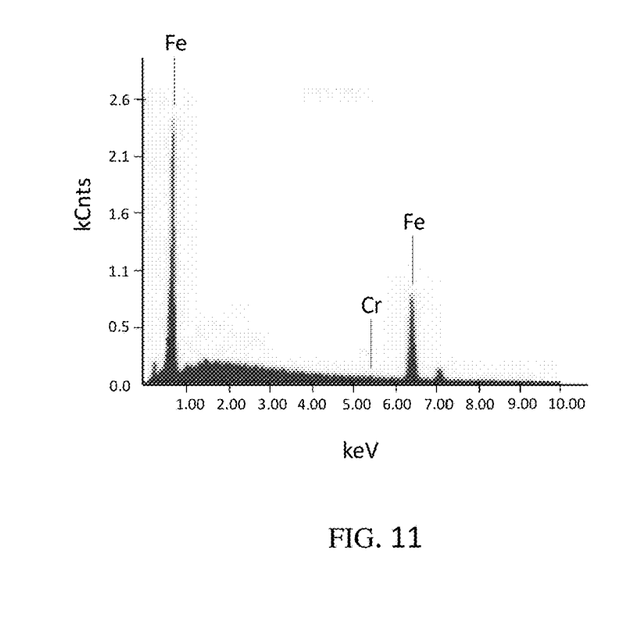
FIG. 11 illustrates an EDS of the particular material at the second location.
Figure 12:
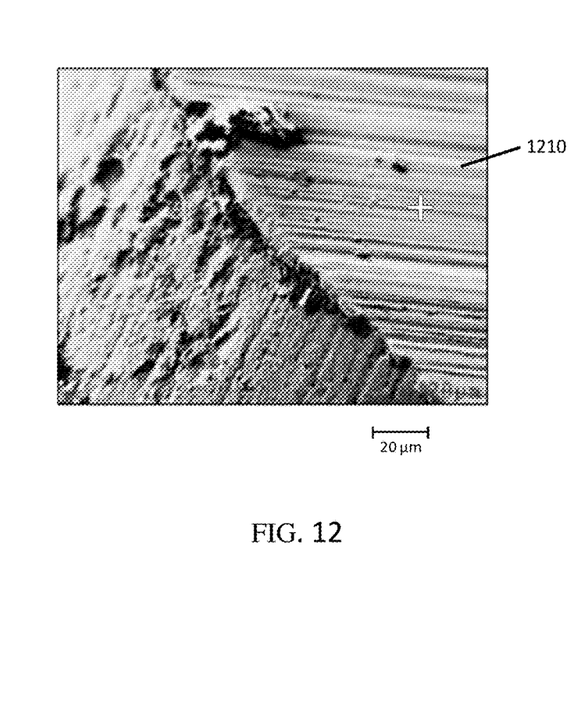
FIG. 12 illustrates a third location on the particular material.
Figure 13:
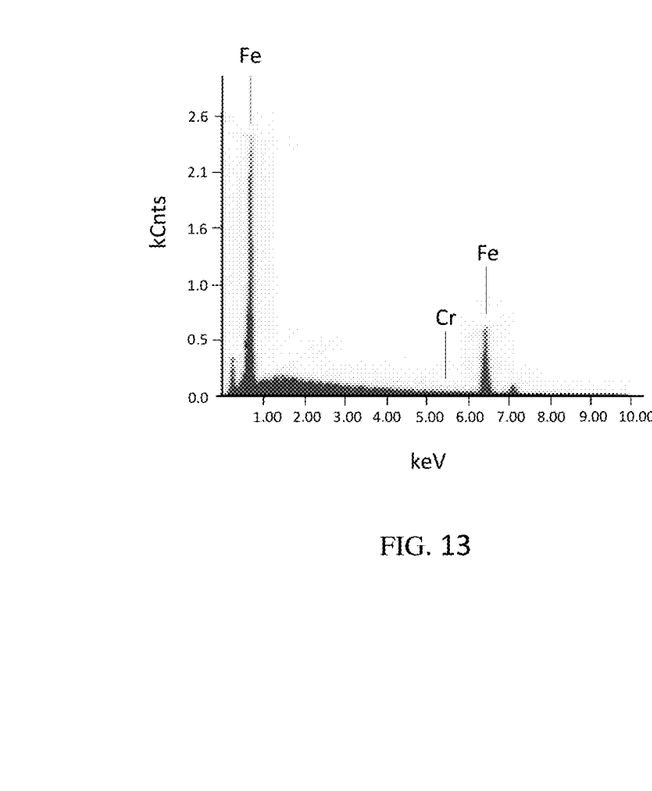
FIG. 13 illustrates an EDS of the particular material at the third location.

FIG. 10 illustrates the iron wire substrate 1010, while FIG. 11 illustrates an energy dispersive spectroscopic analysis (EDS) performed with the scanning electron microscope at the spot marked with a black "+" of FIG. 10. Similarly, FIG. 12 illustrates the iron wire substrate 1210, while FIG. 13 illustrates an energy dispersive spectroscopic analysis (EDS) performed with the scanning electron microscope at the spot marked with a black "+" of FIG. 12. FIGS. 8-13 reinforce the interpretation that a coating of chromium metal deposits on the substrate as a result of the disclosed process. The EDS analysis of the marked spots of FIGS. 10 and 12, away from the formed surface layer, clearly show only peaks reflecting the Fe signal and lacking a peak at the Cr signal. There is substantially no chrome present at the EDS locations of FIGS. 10 and 12. Thus a chrome metal surface layer formed on the iron wire when treated per the preferred process described above.

EXAMPLE 2

In another embodiment, Chromium (III) nitrate nonahydrate (Sigma-Aldrich 99.0 pct), urea, and sodium carbonate monohydrate ($Na_2CO_3$) (Sigma-Aldrich 99.5 pct) were mixed in a ratio of 1:2:3 by mass. In order to make a solution for coating a substrate, ethanol was added to the resulting mixture at a mass ratio of about 1:4 (mix:ethanol). A stainless steel substrate was dipped into the wetted powder mix to generate an adherent layer, then allowed to air dry for approximately 90 seconds. The substrate was then dipped and dried for 2 more cycles. Small amounts of ethanol were added to the mixture during the dipping process to maintain wetness. After the final dip and the substrate dried, it was placed in an empty alumina boat for RES processing.

The alumina boat was covered with a second alumina boat then placed in a 20 mm diameter quartz tube. $N_2$ was applied to the tube at a rate of 100 sccm for about 15 minutes to purge the system of air. The gas flow rate was reduced to 10 sccm and the alumina boat was positioned in the approximate center of the pre-heated furnace at 1000° C. The temperature was allowed to stabilize, requiring approximately 5 min, and the process proceeded for precisely 3 additional minutes. Once the 3 minutes elapsed, the alumina boat was removed from the heated zone, and gas flow rate was increased to 100 sccm. After 10 minutes the flow of nitrogen gas was halted and the alumina boat was allowed to cool to room temperature.

Once cooled, the treated substrate was cut using a commercial diagonal wire cutting pliers and hot mounted using a commercial conductive filled phenolic mounting compound. The resulting phenolic pucks were transferred to the Buehler EcoMet 4 variable speed grinder-polisher with AutoMet 2 power head for grinding. Polishing was carried out to remove the abrasions caused by grinding.

Optical microscopy was performed using a Nikon Epiphot 200 optical microscope. Scanning Electron Microscopy (SEM) was conducted using a Zeiss Neon 40 field emission scanning electron microscope with Energy Dispersive Spectroscopy (EDS). The sample was placed in a drying oven for approximately 24 hours prior to SEM to ensure no moisture present. The instrument parameters during characterization were set to a voltage of 20 kV, a working distance between 6-8 mm, and an aperture size of 60 µm.

Figure 14:
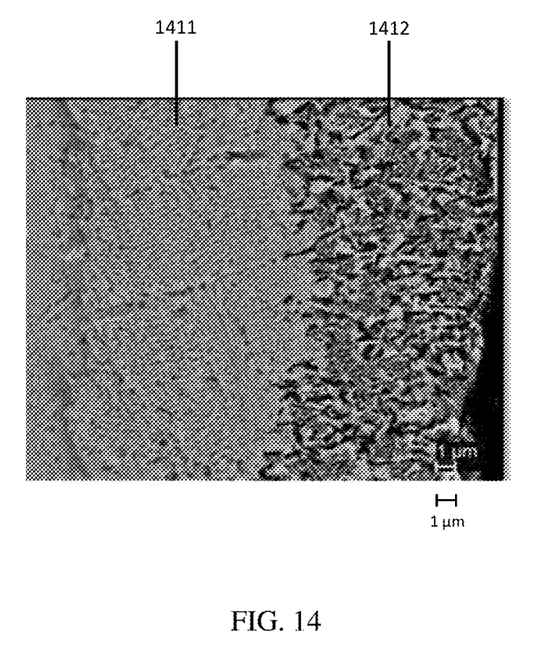
FIG. 14 illustrates an additional material generated by the disclosed method.

Characterization of the treated substrate revealed 2 distinct morphological changes on the outer edge of the substrate. Two adjacent surface layers were noted with the inner layer measuring about 9 µm and the outer layer about 11 µm in thickness. This is shown at FIG. 14 indicating inner layer 1411 and outer layer 1412. The inner layer contained small elongated pits throughout. The outer layer was very porous in appearance containing features similar to the inner region coupled with larger pockets in an organized arrangement.

Figure 15:
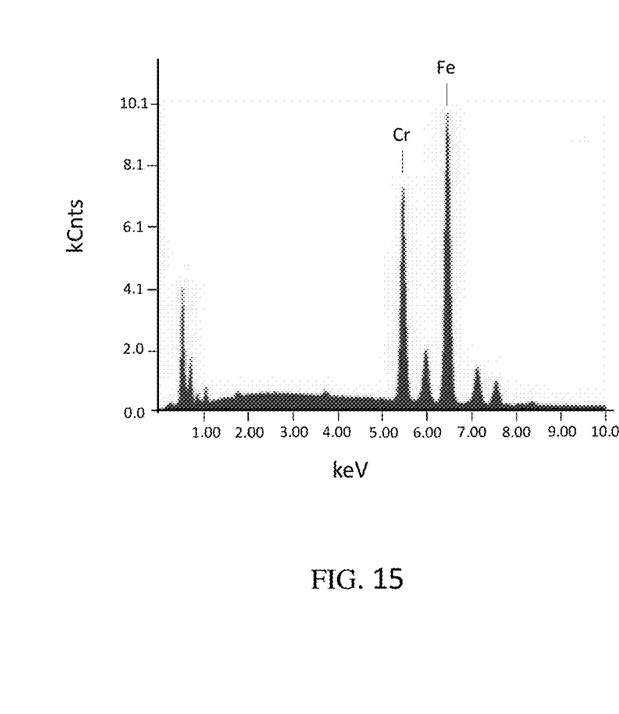
FIG. 15 illustrates an EDS of the additional material at a first location.
Figure 16:
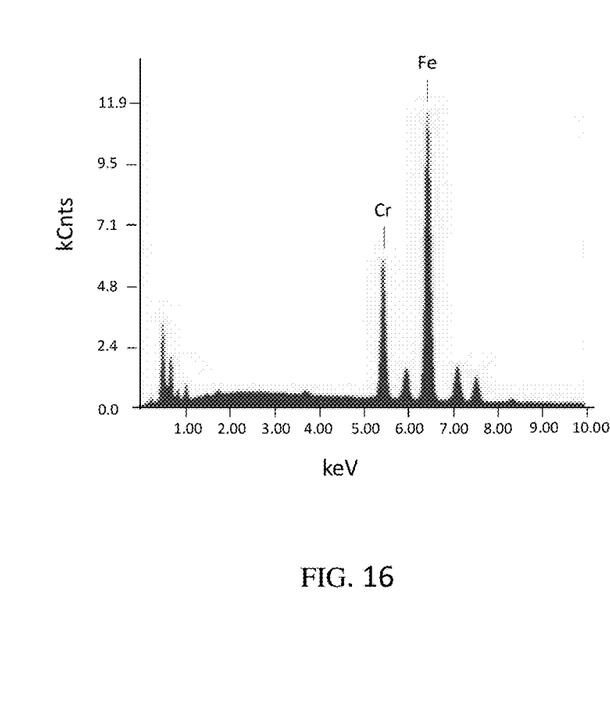
FIG. 16 illustrates an EDS of the additional material at a second location.
Figure 17:
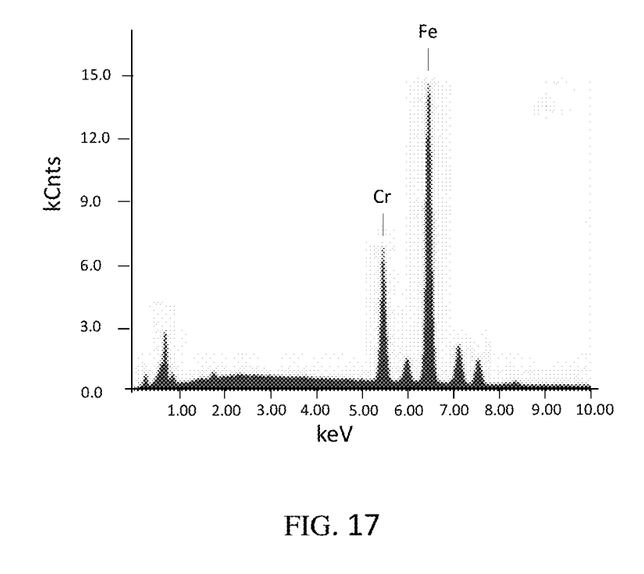
FIG. 17 illustrates an EDS of the additional material at a third location.

EDS spot analysis of the treated sample targeted the surface layers identified. A quantitative profile on targeted areas of the scanned SEM image is shown at FIG. 15 for inner layer 1411, FIG. 16 for outer layer 1412, and FIG. 17 for the bulk material, where signals Fe and Cr indicate the presence of iron and chrome respectively. The inner layer displayed constant levels of carbon, a slight increase in the metal-oxide ratio to 4 AT %, and chromium enrichment on the surface. FIG. 16 indicates low carbon content, <5 AT %, on the outer layer, a metal-oxide ratio >5/1 suggesting little oxidation, and small amounts of sodium. EDS mapping of the selected region confirmed that this Protocol process introduced oxygen on the surface as well as traces of sodium on the outer edge, however, the chromium layer formed supports the ability of the disclosed process to deposit metal on a surface.

Thus, provided here is a method for generating a metallic coating on a substrate utilizing a mixture of a precursor compound and a chemical agent, where the precursor compound typically comprises a metal oxide such as a chromium oxide and the chemical agent is a compound that generates reducing gas typically CO, $H_x$, and/or $NH_x$ upon thermal decomposition. Generally, the precursor compound and chemical agent are in the form of particulates having mean diameters less than about 100 microns, and a transport fluid is added for the purpose of facilitating application of the mixture to a substrate. The mixture is applied to the substrate and the mixture coated substrate is heated to a decomposition temperature of typically about 700° C. The temperature decomposes the chemical agent generating the reducing gas species and/or radicals and the mixture coated substrate is maintained at the decomposition temperature for a period of time, typically minutes, sufficient to allow the reducing gas to contact the precursor material and deposit a metallic coating on the surface of substrate. In an embodiment, contact between the reducing gas and the precursor material generates a zero valence metal comprising the metal of the precursor material, and the metallic coating comprises the zero valence metal. Typically the mixture coated substrate is heated in a reactor having an inert atmosphere, and some portion of the reducing gas and reaction produces are exhausted from the reactor.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of generating a metal coated substrate comprising generating a mixture solution comprising a precursor compound, a chemical agent selected from the group of chemical compounds consisting of a nitrogen-hydrogen containing molecule, ammonia, and a compound containing —NH$_z$, where z is ≥1, that produces reducing gas upon thermal decomposition, and an inert transport fluid, where the precursor compound comprises a metal, and where the reducing gas comprises at least one of CO, H$_x$, NH$_x$, or mixtures thereof, where x is greater than or equal to 1, and where the inert transport fluid comprises at least 30 weight percent of the mixture solution;
  coating a surface of a substrate with the mixture solution and forming an adherent layer of the mixture solution in contact with the surface of the substrate, thereby generating a mixture coated substrate;
  heating the mixture coated substrate to a decomposition temperature where the decomposition temperature is sufficient to thermally decompose the chemical agent and produce the reducing gas;
  maintaining the mixture coated substrate at the decomposition temperature for a period of time sufficient for the reducing gas to contact the precursor material and generate a metallic coating on the surface of the substrate, where the metallic coating comprises a surface layer coating the surface of the substrate and further comprises a layer of adhering material separated from the substrate by the surface layer, and where the surface layer comprises the metal comprising the precursor compound, thereby generating a treated substrate; and
  polishing the treated substrate and removing some portion of the layer of adhering material while retaining the surface layer as a coating on the surface of the substrate, thereby generating the metal coated substrate.

2. The method of claim 1 where the precursor compound comprises a metal oxide or metal hydroxide.

3. The method of claim 2 where the chemical agent comprises NH$_3$.

4. The method of claim 3 where the decomposition temperature is from about 400° C. to about 1200° C.

5. The method of claim 4 where the precursor compound comprises the metal oxide and the metal comprising the metal oxide is selected from the group consisting of chromium, nickel, or mixtures thereof.

6. The method of claim 1 where the mixture comprises a weight ratio of the chemical agent to the precursor compound of at least 3.

7. The method of claim 1 where the precursor compound comprises a plurality of first particles and the chemical agent comprises a second plurality of particles, where a mean diameter of the first plurality of particles is less than 500 microns and a mean diameter of the second plurality of particles is less than 500 microns, and where generating the mixture solution further comprises:
  mixing the first plurality of particles and the second plurality of particles to generate a solid-solid heterogeneous mixture; and
  adding the inert transport fluid to the solid-solid heterogeneous mixture in an amount such that the inert transport fluid comprises the at least 30 weight percent of the mixture solution, thereby generating the mixture solution.

8. The method of claim 1 further comprising:
  placing the mixture coated substrate in a reactor;
  exposing the mixture coated substrate to a heated inert atmosphere in the reactor, where the heated inert atmosphere has a temperature equal to the decomposition temperature, thereby heating the mixture comprising the mixture coated substrate;
  generating a reaction gas as the reducing gas contacts the precursor compound;
  exhausting some portion of the reaction gas from the reactor, thereby generating the treated substrate; and
  removing the treated substrate from the reactor.

9. The method of claim 8 where an inert gas comprises at least 90 volume percent of the heated inert atmosphere, where the inert gas is selected from the group consisting of nitrogen, argon, helium, or mixtures thereof.

10. The method of claim 9 where contacting between the precursor compound and the reducing gas generates a zero valence metal, and where the metallic coating comprises the zero valence metal.

11. The method of claim 1 where the inert transport fluid is selecting from the group consisting of water, ethanol, or mixtures thereof.

12. The method of claim 1 wherein when the chemical agent comprises carbon, the layer of adhering material comprises some portion of the carbon comprising the chemical agent.

13. A method of generating a chromium coated substrate comprising:
  generating a solid-solid heterogeneous mixture comprising a precursor compound and a chemical agent comprising urea, CO(NH$_2$)$_2$, that produces reducing gas upon thermal decomposition at a decomposition temperature, where the precursor compound comprises a chromium oxide, and where the reducing gas comprises at least one of CO, H$_x$, NH$_x$, or mixtures thereof, where x is greater than or equal to 1, and where the decomposition temperature is from about 400° C. to about 1200° C. and where the precursor compound comprises a plurality of first particles and the chemical agent comprises a second plurality of particles, where a mean diameter of the first plurality of particles is less than 500 microns and a mean diameter of the second plurality of particles is less than 500 microns;
  generating a mixture solution by adding an inert transport fluid to the solid-solid heterogeneous mixture in an amount such that the inert transport fluid comprises at least 30 weight percent of the mixture solution;
  coating a surface of a substrate with the mixture solution and forming an adherent layer of the mixture solution in contact with the surface of the substrate, thereby generating a mixture coated substrate;
  heating the mixture comprising the mixture coated substrate to a temperature at least equal to the decomposition temperature and thermally decomposing the chemical agent and producing the reducing gas; and
  maintaining the mixture comprising the mixture coated substrate at the decomposition temperature for a period of time sufficient for the reducing gas to contact the precursor material and generate a chromium coating on the surface of the substrate, where the chromium coating comprises a surface layer coating the surface of the substrate and further comprises a layer of adhering material separated from the substrate by the surface layer, and where the surface layer comprises chromium comprising the chromium oxide of the precursor compound, thereby generating a treated substrate; and
  polishing the treated substrate and removing some portion of the layer of adhering material while retaining the surface layer as a coating on the surface of the substrate, thereby generating the chromium coated substrate.

14. The method of claim 13 further comprising:
placing the mixture coated substrate in a reactor;
exposing the mixture coated substrate to a heated inert atmosphere in the reactor, where the heated inert atmosphere has a temperature equal to the decomposition temperature, thereby heating the mixture comprising the mixture coated substrate;
generating a reaction gas as the reducing gas contacts the precursor compound;
exhausting some portion of the reaction gas from the reactor, thereby generating the treated substrate; and
removing the treated substrate from the reactor.

15. The method of claim 14 where the mixture comprises a weight ratio of the chemical agent to the precursor compound of at least 2.

16. The method of claim 13 where the inert transport fluid is selecting from the group consisting of water, ethanol, or mixtures thereof.

17. The method of claim 13 where the chemical agent comprises carbon and where the layer of adhering material comprises some portion of the carbon comprising the chemical agent.

* * * * *